Oct. 14, 1969  W. HAKKARINEN  3,473,038
WIND DRIVEN GENERATOR

Filed June 24, 1966  2 Sheets-Sheet 1

INVENTOR
WILLIAM HAKKARINEN

BY *Arthur L. Branning*
ATTORNEY

United States Patent Office 3,473,038
Patented Oct. 14, 1969

3,473,038
WIND DRIVEN GENERATOR
William Hakkarinen, Hyattsville, Md., assignor to the United States of America as represented by the Secretary of the Navy
Filed June 24, 1966, Ser. No. 560,957
Int. Cl. H02p 9/04; F03d 9/00
U.S. Cl. 290—44                                   3 Claims

ABSTRACT OF THE DISCLOSURE

A windcharger for the generation of alternating current power. Rotor and stator windings are located within a housing positioned at the hub of a bladed fan so designed as to operate under omnidirectional winds. The stator windings are keyed to a center supporting shaft while the rotor windings are around the inner periphery of the housing and rotate with the fan.

---

The invention described herein may be manufactured and used by or for the Government of the United States of America for governmental purposes without the payment of any royalties thereon or therefor.

The present invention relates generally to an apparatus for generating electrical energy and, more particularly, to an apparatus for converting natural wind energy into electrical energy.

The development of wind driven electric generators, or wind-chargers as they are called, have been greatly handicapped by their overall efficiency of only 10%, and by the seasonal periods of calm when the wind velocity is not sufficient to generate the required power output. To overcome such handicaps, it is frequently necessary that additional power sources such as storage batteries be employed to supply the required power. Furthermore, windchargers which are designed for use at sea, such as on buoys where they would supply a source of electric energy to power lights and other electric devices, must be rugged and substantially maintenance free such that they would have a service life at least equal to the service life of the buoy.

In order to increase the efficiency of windchargers, prior art devices have been proposed which make optimum use of the wind by either turning the fan of the windcharger into the direction of the wind or by varying the pitch of the blades on the fan. These devices are generally designed to operate with the wind only approaching the frontal porton of the fan and the mechanism for providing such adjustments add to the complexity of the device and to the maintenance problems that may be encountered. The problem therefore remains of providing a simple windcharger having a long service life and which will operate efficiently in omnidirectional winds.

Accordingly, an object of the present invention is the provision of a simple and efficient wind driven generator.

Another object of the present invention is to provide a windcharger having an armature-stator arrangement which will eliminate the use of slip rings and brushes.

Still another object of the present invention is to provide a windcharger having an annular armature and a disc-type stator.

A further object of the present invention is to provide a windcharger in which electrolytic corrosion at the stator terminal of the windcharger is substantially prevented.

Another object of the present invention is the provision of a wind-driven electric generator having a rectifier circuit with blocking capacitors therein for eliminating any direct current potential from being sustained on the stator windings or the stator terminals.

Still another object of the present invention is to provide a windcharger having a fan which will be rotated effectively in omnidirectional winds.

Other objects, advantages and novel features of the present invention will become apparent from the following detailed description of the invention when considered in conjunction with the accompanying drawings wherein.

Figure 1:
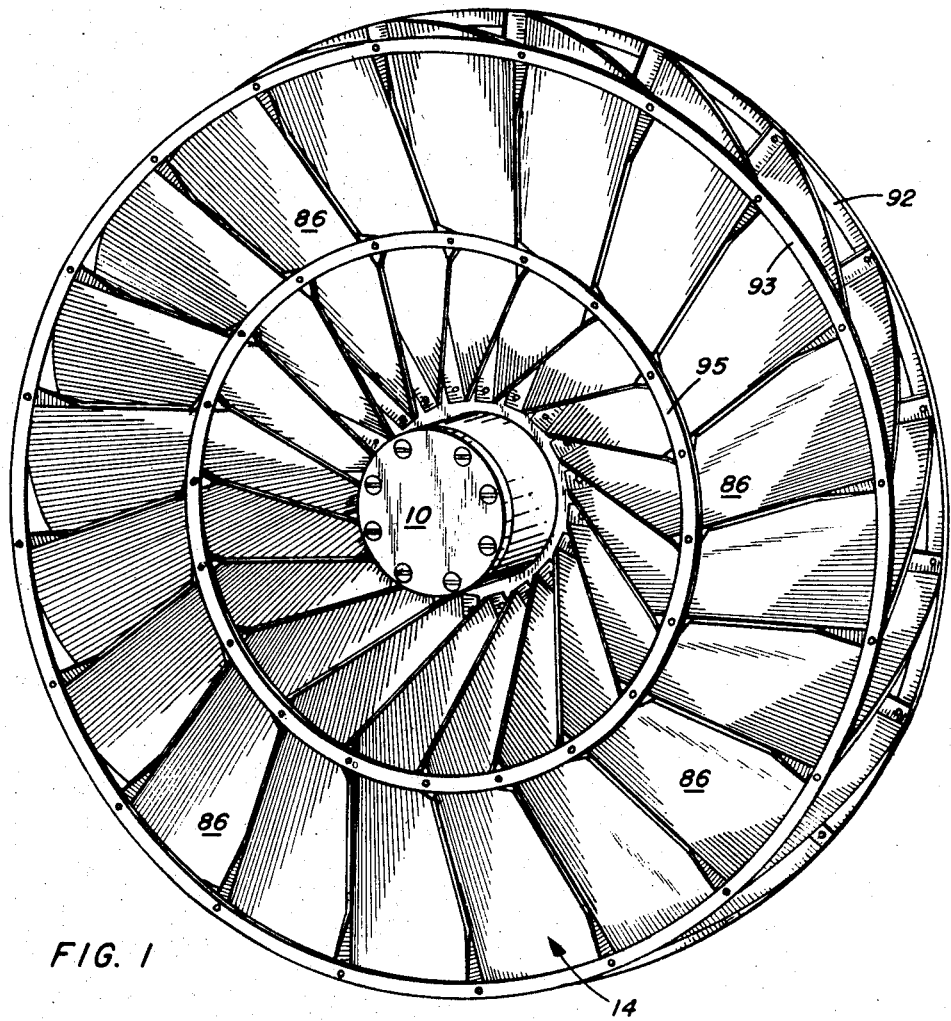
FIG. 1 is a perspective view of the windcharger showing the rear of the housing and the attached impeller fan.

In the illustrated embodiment of the invention, the device includes a housing 10 rotatably mounted on a center shaft 12. Coupled to the outside of the housing is an impeller fan 14 and mounted on the inside of the housing is an annular rotor 16. A disc-type stator 18 is integrally attached to shaft 12 and a portion of the shaft extends beyond the front of the housing for mounting the windcharger. The energy of the wind striking the impeller fan will rotate both the housing and the armature about the shaft and the connected stator in order to thereby generate an electric current in the stator.

The housing 10 specifically comprises a cylindrical casing 21 and a cover 26 attached to rear of the casing. The casing is formed with a cylindrical side wall 22 and an annular front face 24 formed at the front portion of the side wall. The circular cover 26 is formed with an annular lip 27 which is designed to snugly fit within the rear opening of casing 21 and a plurality of suitable fastening means, such as screws 28, hold the cover in position. An O-ring seal 29 is provided around lip 27 for creating a water-tight seal between the cover and the casing. A blind bore is provided at the center of the front face of cover 26 and an annular bearing means 29 is mounted within a portion of this bore. An annular bearing means 32 is also mounted within the central opening of front face 24. The annular-shaped multi-pole armature or rotor 16 is made from suitable permanent magnetic material and is mounted within the casing 21. The armature is held against the front face of casing 21 by an annular ring 34 and by screws 36 which extend from the ring into the front face of the casing.

The center shaft 12 is provided with a lip 38 around the central portion thereof which abuts against the side of bearing 32 in order to position the shaft within the housing, and a front portion of the shaft extends through annular bearing 32 to the outside of the housing. Formed at one end of shaft 12 is a coaxial stub shaft 40 which is designed to fit into annular bearing means 29 in cover 26 and which, in combination with the shaft mounting in the forward section of the housing, is designed to permit the housing to rotate about the center shaft. A disc-type stator, formed with a conventional center coil surrounded by a magnetic shell of alternating poles, is keyed onto shaft 12 by key 43. An electrical insulating board 44 made of phenolic, for example, is positioned against the rear face of the stator and is held in this position by a collar 46 which fits over the shaft and is locked in place by screw 48. A suitable rectifier circuit 50, as will hereinafter be described, is mounted on the insulating board and is connected to both the stator output wires and the lead wire 54. A central bore 52 is provided in shaft 12 which extends from the front of the shaft through almost the entire length of the shaft and then opens outwardly through the side wall. An insulated lead wire 54 extends from the output terminals 80, 82 of the rectifier circuit through bore 52 to the outside of the housing where the wire may be connected to any piece of equipment 84 that must be electrically powered. A suitable threaded seal means 55 encompasses wire 54 and is screwed into the front of shaft 12 in order to prevent any dirt or moisture from entering through the bore to the inside of the housing.

The front portion of the shaft which extends outside the housing has threads 56 formed thereon for receiving nuts 58, 68. In mounting the assembled windcharger, the threaded shaft having nut 58 thereon is inserted through an opening in a mounting bracket 62 and lock nut 60 is threaded on the shaft so as to hold the shaft of the windcharger statioinary and thereby permitting the housing to freely rotate about the shaft. A suitable locking means such as screw 64 is employed to lock the nut 60 in a tightened position.

Figure 3:
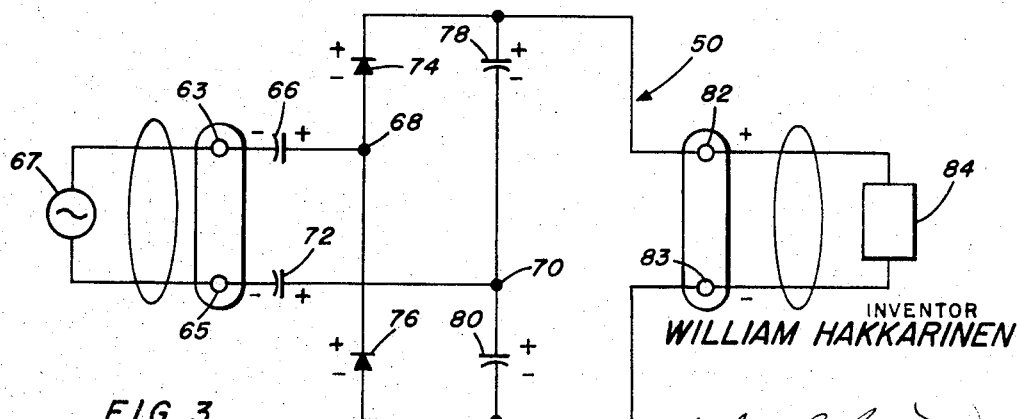
FIG. 3 is a schematic view of the rectifier circuit located between the stator terminals of the windcharger and the output terminals of the device.
Figure 2:
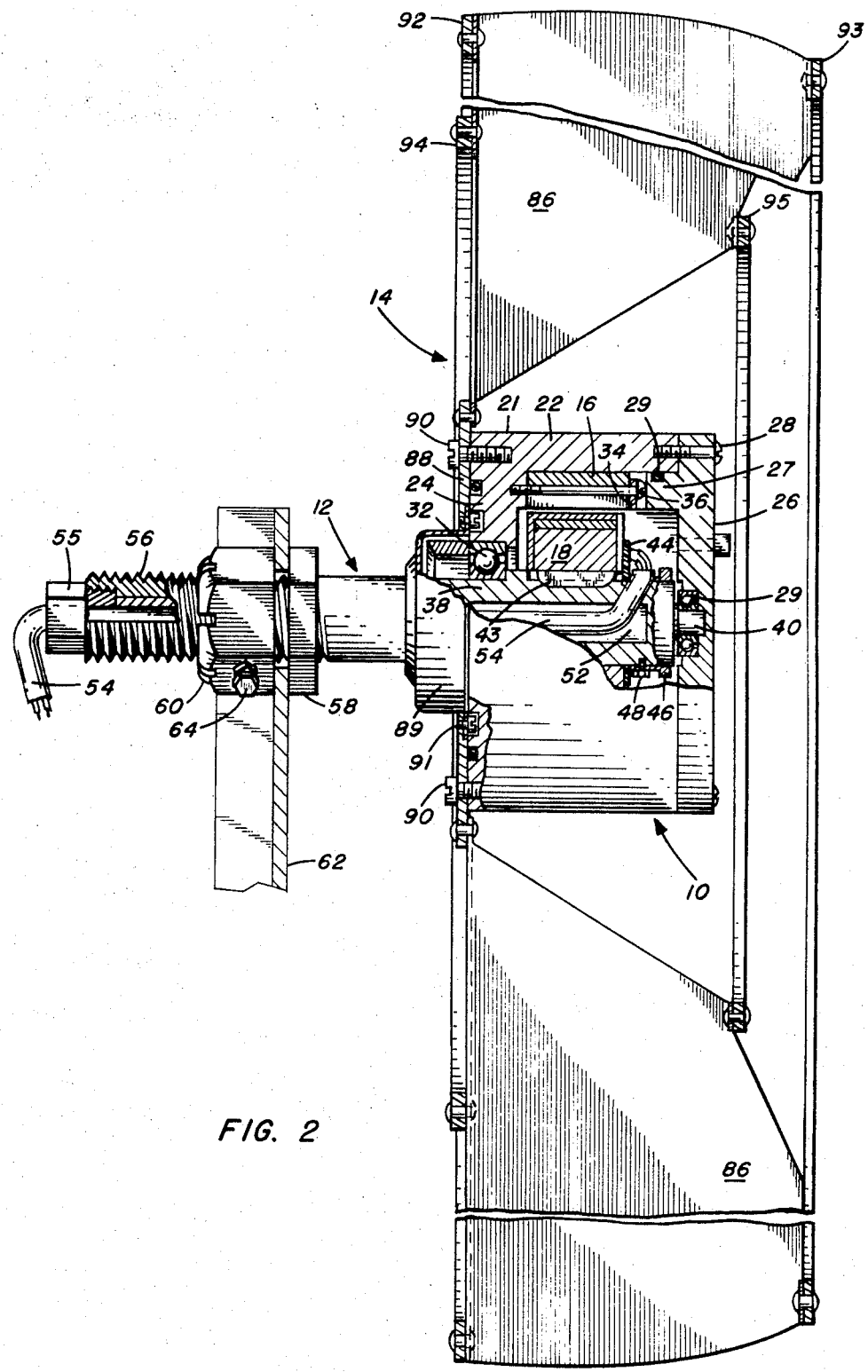
FIG. 2 is a side view of the device with parts broken away and showing two blades of the fan.

Referring now to the circuit shown in FIG. 3, the output from the windcharger, shown as reference numeral 67, is electrically connected to stator terminals 63, 65. Terminal 63 is electrically connected via blocking capacitor 66 to junction 68 and the second stator terminal 65 is electrically connected to junction 70 via the blocking capacitor 72. The anode of diode 74 and the cathode of diode 76 are connected in series with junction 68. Similarly, the negative plate of filter capacitor 78 and the positive plate of filter capacitor 80 are connected in series with junction 70. The cathode of diode 74 and the positive plate of filter capacitor 78 are electrically coupled together with output terminal 82. Likewise, the anode of diode 76 and the negative plate of capacitor 80 are electrically connected together with terminal 83. The circuit is designed so that the voltages on the filter capacitors 78, 80 add their outputs such that the circuit is capable of delivering at the output terminals 82, 83 a voltage which is twice the magnitude of the applied alternating source voltage. The blocking capacitors 66, 72, respecitvely, prevent any direct current potential from being sustained on the stator terminals and thus electrolytic corrosion within the stator and at the stator terminals is substantially eliminated. A further function of the blocking capacitors is to provide a low alternating current impedance path between the output of the windcharger and the input of the rectifier circuitry.

The impeller fan 84 is made up of a multiplicity of blades 86 attached to a suitable annular hub-plate 88 which is rigidly atached to the front face of the housing by screws 90. A dust cover 89 encompassing shaft 12 is positioned within the central opening of plate 88 and is rigidly connected thereto by screws 91. The blades project rearwardly from the hub-plate at an angle of approximately 45°. Reinforcing rings 92, 93 are attached to the outer periphery of the blades and similar rings 94, 95 are connected at the approximate mid-portion of the blades. All reinforcing rings are substantially concentric with shaft 12. It will be apparent that the fan, with its 45° angle blades, will be driven in either clockwise or counter-clockwise direction depending upon the direction of the wind. Furthermore, the windwheel will also be driven when wind approaches at an angle of 90° to the front portions of the blades.

In operation, the assembled windcharger will be mounted as shown in FIG. 3 and the impeller fan, housing and armature will be rotated about the center shaft when the impeller fan is acted upon by wind engery. The rotation of the armature relative to the disc-type stator induces a current in the stator windings and this induced current output from the stator is electrically connected to stator terminals 63, 65 of the rectifier circuit. The rectified direct current output is electrically conducted via lead wire 54 to the equipment which must be electrically powered.

It will be apparent from the foregoing disclosure that a windcharger has been constructed which, because of the specific annular rotor and disc-type stator design, does not require slip rings or brushes. Furthermore, the use of blocking capacitors between the stator terminals and the rectifier circuit prevents any direct current potential from being sustained on the stator terminals and electrolytic corrosion at the stator terminals is thereby substantially prevented. Finally, the design of the impeller fan with annular reinforcing ribs permits optimum use of the fan in both high and low velocity winds.

Obviously many modifications and variations of the present invention are possible in the light of the above teachings. It is therefore to be understood that within the scope of the appended claims the invention may be practiced otherwise than as specifically described.

What is claimed is:
1. A windcharger comprising
a rigid support for mounting the windcharger;
a center shaft extending transversely through substantially the entire length of the windcharger and terminating at one end of a rigid connection with the support;
a disc-type stator integrally attached to the other end of the shaft about the periphery of the shaft;
an output line electrically connected to the stator and extending along the center of the shaft;
a housing encompasing the other end of the shaft and stator and rotatably mounted on said other end of the shaft; and
an annular armature rigidly mounted around the inner periphery of the housing and in close proximity to the stator so that when the housing is rotated by the wind the armature rotates about the stationary stator to generate an electric current.

2. A windcharger as described in claim 1 which is further characterized by and impeller fan coupled to said housing and adapted to be acted upon by omnidirectional winds, wherby the force of the wind acting upon said impeller fan causes rotation of said impeller fan and said housing.

3. A windcharger as described in claim 2 wherein said impeller fan comprises a center hub plate rigidly attached to the front face of said housing, a plurality of blades attached to said hub plate and extending radially outwardly from one face of said hub plate at an angle of approximately 45° to said hub plate, and a plurality of concentric reinforcing rings attached to said blades.

References Cited
UNITED STATES PATENTS

| | | | |
|---|---|---|---|
| 2,153,523 | 4/1939 | Roberts et al. | 290—44 |
| 2,177,801 | 10/1939 | Erren | 290—55 |
| 1,423,514 | 7/1922 | Butusov, | 290—55 |
| 1,958,043 | 5/1934 | Heintz | 310—156 |

ORIS L. RADER, Primary Examiner

K. L. CROSSON, Assistant Examiner

U.S. Cl. X.R.
290—55; 310—156